(12) United States Patent
Sugimoto

(10) Patent No.: US 6,238,021 B1
(45) Date of Patent: May 29, 2001

(54) BRAKE CONTROL SYSTEM FOR VEHICLE

(75) Inventor: Yoichi Sugimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/329,306

(22) Filed: Jun. 10, 1999

(30) Foreign Application Priority Data

Jun. 11, 1998 (JP) .................................................. 10-163611

(51) Int. Cl.[7] .................................. B60T 8/32; B60T 8/60
(52) U.S. Cl. .......................... 303/193; 303/149; 180/169
(58) Field of Search .................................... 303/193, 191, 303/148, 149; 180/169

(56) References Cited

U.S. PATENT DOCUMENTS 5,540,298 * 7/1996 Yoshioka et al. ..................... 303/193
6,035,251 * 3/2000 Hac et al. .............................. 303/148
6,092,882 * 7/2000 Matsuno ................................ 303/148

FOREIGN PATENT DOCUMENTS 6-298022  10/1994 (JP) .

* cited by examiner

*Primary Examiner*—Robert J. Oberleitner
*Assistant Examiner*—Robert A. Siconolfi
(74) *Attorney, Agent, or Firm*—Arent Fox Kintner Plotkin & Kahn, PLLC

(57) ABSTRACT

When carrying out automatic braking in order to avoid contact of a vehicle with an object, the behavior of the vehicle is prevented from becoming unstable due to abnormal road surface conditions in which the coefficients of friction of the road surface are different for the right and left wheels. An object which is present in the direction in which the vehicle is advancing is sensed by a radar device, and based on the sensing results if it is determined that there is a possibility of the vehicle making contact with the object, the automatic braking system operates the braking device at time $t_0$ so as to carry out automatic braking. At the time of starting the automatic braking, if an abnormal road surface condition in which the coefficients of friction of the road surface are different for the right and left wheels, is sensed based on the difference in the slip rate between the right and left wheels, at time $t_1$ the rising gradient of the braking force of the automatic braking is suppressed to a low level and this prevents the behavior of the vehicle from becoming unstable due to the occurrence of an undesirable yaw movement. The sensing of an abnormal road surface condition can also be carried out based on the operational status of the anti-lock brake system, the yaw rate or the lateral acceleration.

7 Claims, 7 Drawing Sheets

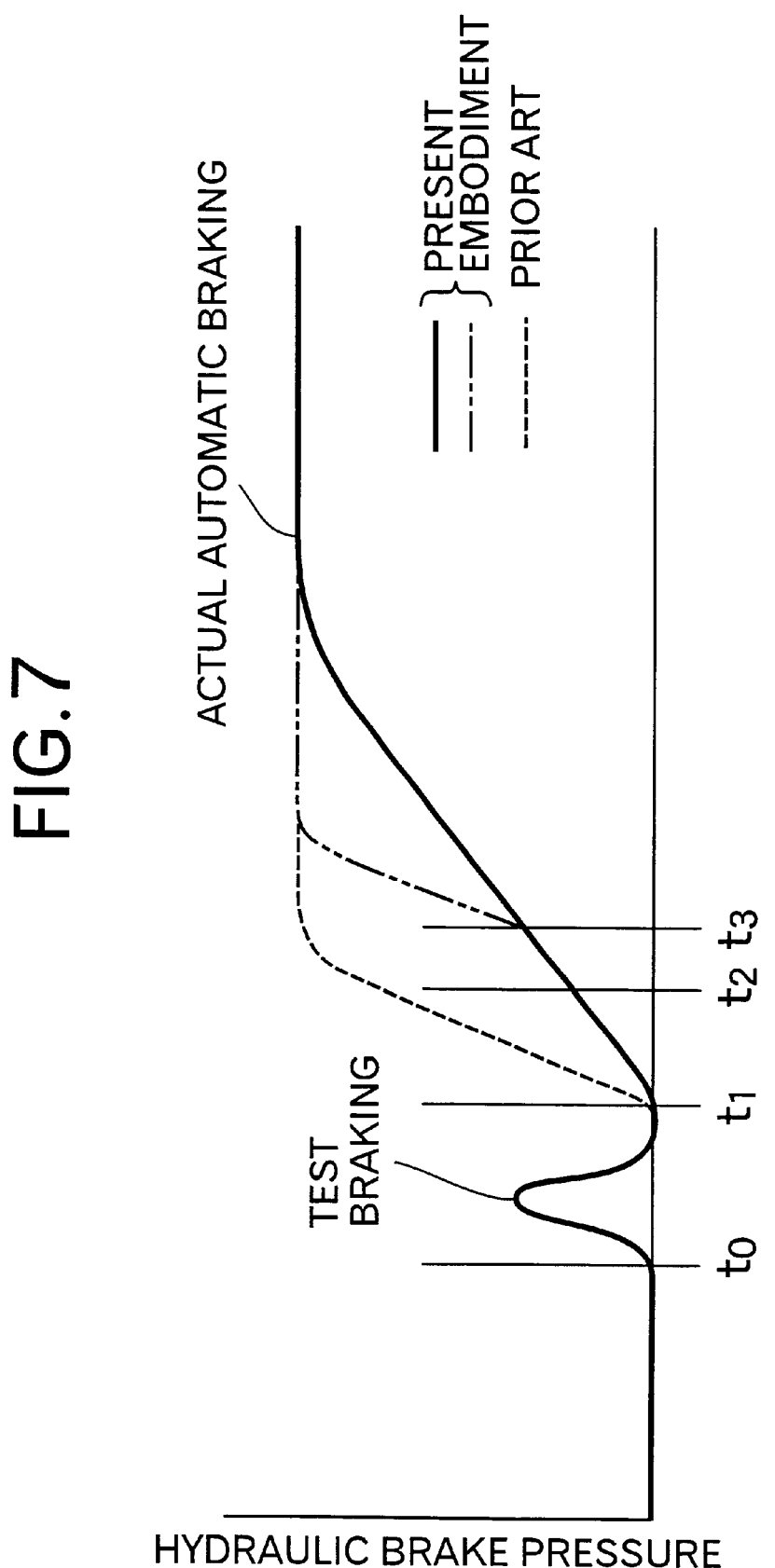

BRAKE CONTROL SYSTEM FOR VEHICLE

BACKGROUND OF THE INVENTION

1 Field of the Invention

The present invention relates to a brake control system for a vehicle which, based on a relative position between the vehicle and an object sensed by an object sensing device such as a laser radar, automatically operates the braking device in order to prevent contact of the vehicle with the object.

2 Description of the Prior Art

Such a brake control system for a vehicle is already known as for example, in Japanese Patent Application Laid-open No. 6-298022. This system has an arrangement in which, when contact of the vehicle with an object can be avoided by operation of the steering alone, the avoidance of the contact is carried out by operating the steering alone without carrying out automatic braking, and in an emergency when contact of the vehicle with an object cannot be avoided by operating the steering alone, automatic braking is carried out to prevent contact.

When carrying out automatic braking in order to avoid contact with a vehicle travelling in front if, for example, the coefficients of friction of the road surface are different for the right and left wheels, a yaw movement is caused, and the behavior of the vehicle becomes unstable and thus there is a possibility that prevention of contact of the vehicle by automatic braking, cannot be carried out effectively.

The present invention has been made with consideration of the above-mentioned circumstances and an objective thereof is to prevent the vehicle from becoming unstable due to abnormal road surface conditions in which the coefficients of friction of the road surface are different for the right and left wheels when carrying out automatic braking, to prevent contact with an object.

SUMMARY OF THE INVENTION

In order to achieve the above-mentioned objective, the present invention is a brake control system for a vehicle comprising an object sensing device for sensing an object positioned in the direction in which the vehicle is advancing, braking devices for braking the vehicle, a determination means coupled to the object sensing device for determining the possibility of contact between the vehicle and the object based upon the relative positions of the vehicle and the object, based on the output of the object sensing device, an automatic braking means coupled to the determination means for carrying out an automatic braking by operating of the braking devices based on the output of the determination means. An abnormal road surface condition sensing means, coupled to the automatic braking means, for sensing an abnormal road surface condition wherein the coefficients of friction of the road surface are different for right and left wheels of the vehicle, and wherein when the abnormal road surface condition sensing means senses an abnormal road surface condition, the automatic braking means sets a rising gradient for the braking force for automatic braking which is lower than the rising gradient when an abnormal road surface condition is not sensed.

With the above-mentioned arrangement, when the object sensing device senses an object which is present in the direction in which the vehicle is advancing, based on the sensing results, the determination means determines the possibility of making contact with the object from the relative positions of the vehicle and the object, and when it is determined that there is a possibility of contact, the automatic braking means operates the braking device to carry out automatic braking in order to avoid contact with the object. When the abnormal road surface condition sensing means senses an abnormal road surface condition in which the coefficients of friction of the road surface for the right and left wheels are different, the automatic braking means sets the rising gradient of the braking force of the automatic braking low, and prevents the vehicle from becoming unstable due to the occurrence of an undesirable yaw movement and thus the avoidance of contact can be achieved with certainty.

The present invention is characterized in that the abnormal road surface condition sensing means senses an abnormal road surface condition based on a difference in the slip rate between the right and left wheels at the time of starting automatic braking.

With the above-mentioned arrangement, in an abnormal road surface condition in which the coefficients of friction of the road surface for the right and left wheels are different, since the slip rate of the wheel on the road surface having a smaller coefficient of friction becomes higher than that of the wheel on the road surface having a larger coefficient of friction, the abnormal road surface condition can be sensed with certainty based on the difference in the slip rate between the right and left wheels.

The present invention is further characterized in that the abnormal road surface condition sensing means senses an abnormal road surface condition based on the operational status of the antilock brake system of the vehicle, at the time of starting automatic braking.

With the above-mentioned arrangement, in an abnormal road surface condition in which the coefficients of friction of the road surface for the right and left wheels are different, since the wheel on the road surface having a smaller coefficient of friction slips to an excess extent due to the automatic braking thus causing the operation of the antilock brake system, the abnormal road surface condition can be sensed with certainty based on the operational status of the antilock brake system. In particular, since an existing antilock brake system is used, not only can the calculation load on the abnormal road surface condition sensing means can be lessened, but it can also contribute to a reduction in cost.

The present invention is still further characterized in that the abnormal road surface condition sensing means senses an abnormal road surface condition based on a yaw rate or lateral acceleration of the vehicle at the time of starting automatic braking.

With the above-mentioned arrangement, in an abnormal road surface condition in which the coefficients of friction of the road surface for the right and left wheels are different, since the wheel on the road surface having a smaller coefficient of friction slips due to the automatic braking sooner than the wheel on the road surface having a larger coefficient of friction thus causing the yaw rate or lateral acceleration, the abnormal road surface condition can be sensed based on the yaw rate or lateral acceleration.

The present invention is also characterized in that test braking in order to sense an abnormal road surface condition is carried out at the time of starting automatic braking and during this test braking the abnormal road surface condition sensing means carries out the sensing of an abnormal road surface condition.

With the above mentioned arrangement, since the abnormal road surface condition is sensed by carrying out test braking at the time of starting automatic braking, the control to lower the rising gradient of the braking force can be performed without delay during an actual automatic braking following the test braking, and thus the behavior of the vehicle can be prevented from becoming unstable with certainty. Furthermore, by subjecting the driver's body to a sensation of deceleration as an alarm accompanying the test braking, active braking can be induced.

The present invention is characterized in that only the front wheels are braked during the test braking.

With the above mentioned arrangement, by putting a sufficient braking force on the front wheels, an abnormal road surface condition can be sensed with certainty, at the same time the deceleration due to the test braking which is sensed by the driver's body, can be suppressed to a low level and thus disagreeable sensations can be eliminated.

BRIEF DESCRIPTION OF THE DRAWINGS

FIG. 7 is a time chart for explanation of the action of a third embodiment of the present invention.

DETAILED DESCRIPTION OF THE PREFERRED EMBODIMENTS

Figure 1:
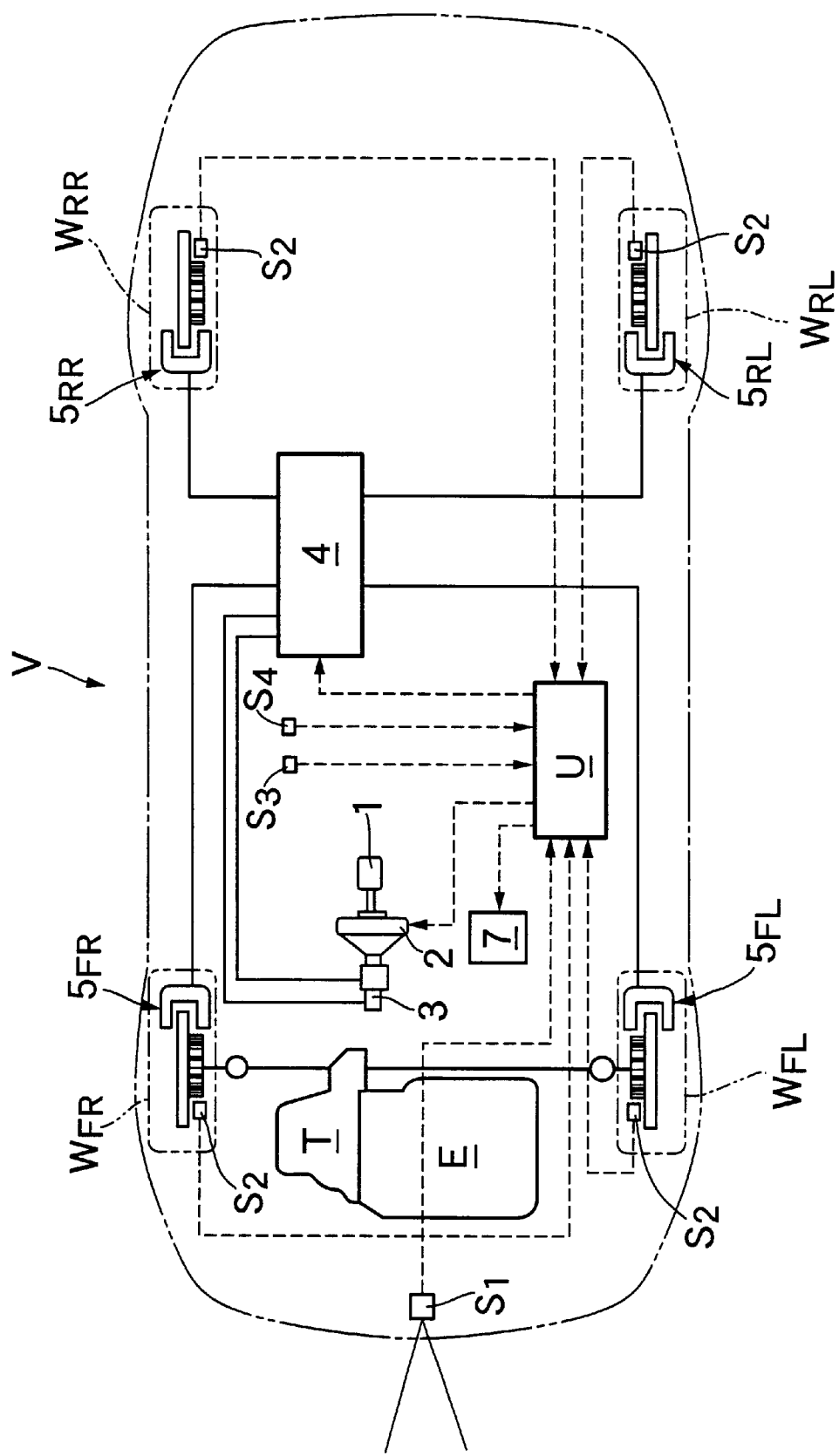
FIG. 1 is an overall view of a vehicle in which the brake control device has been installed according to a first embodiment of the present invention.
Figure 2:
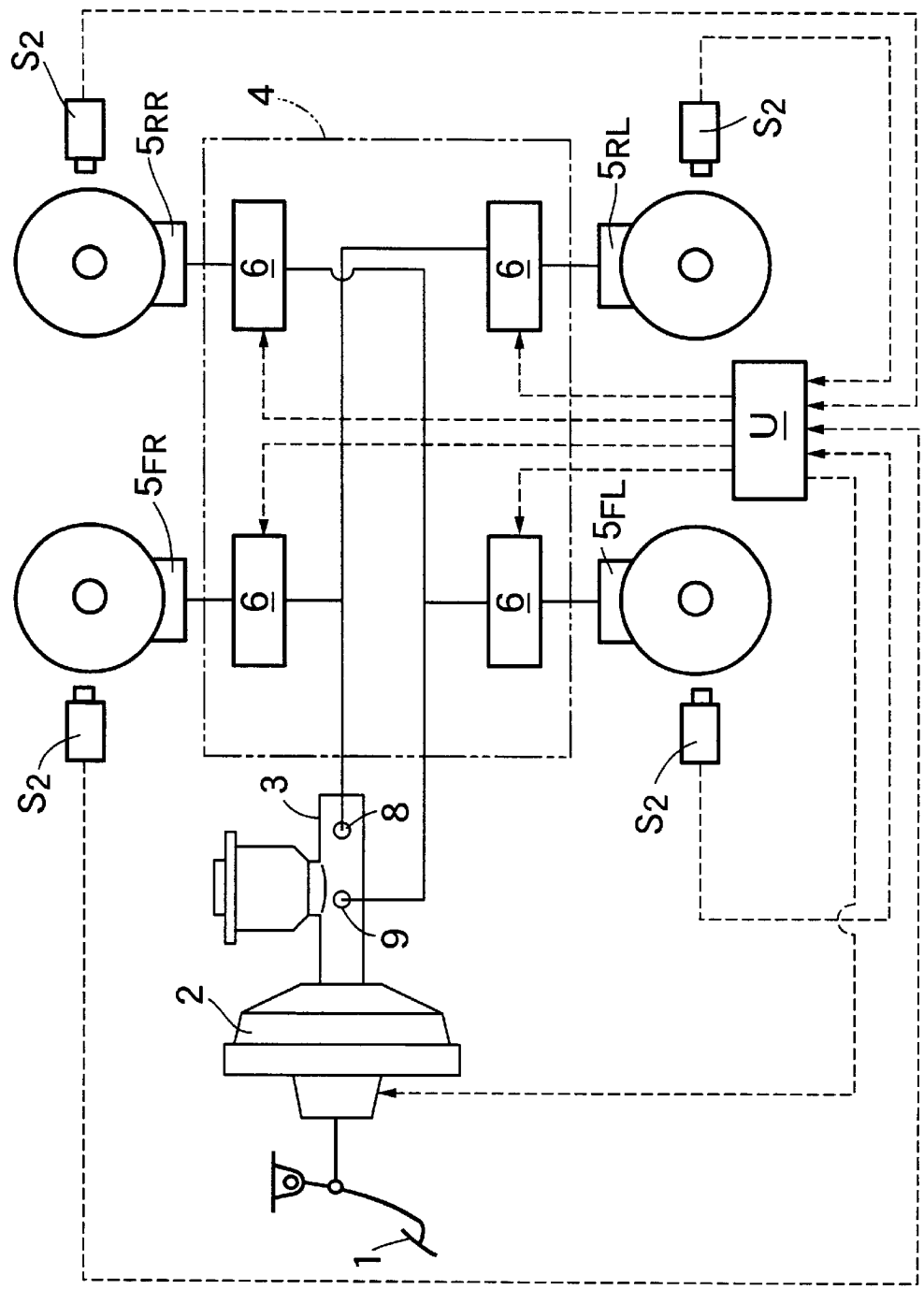
FIG. 2 is a block diagram of the braking system according to the embodiment of the present invention.

As shown in FIGS. 1 and 2, a four wheel vehicle V in which a brake control system of the present invention has been installed comprises front right and left wheels $W_{FR}$ and $W_{FL}$ which are driven wheels to which the driving force from engine E is transmitted via transmission T, and rear right and left wheels $W_{RR}$ and $W_{RL}$ which are follower wheels. Brake pedal 1 operated by the driver, is connected to master cylinder 3 via electronically controlled vacuum booster 2 which is one of the components forming a braking device of the present invention. Electronically controlled vacuum booster 2 operates master cylinder 3 by mechanically boosting the stepping force on brake pedal 1, and at the time of automatic braking, it operates master cylinder 3 according to a braking command signal from electronic control unit U without depending on the operation of brake pedal 1. In the case where a stepping force is input to brake pedal 1 and a brake command signal is input from electronic control unit U, electronically controlled vacuum booster 2 outputs a hydraulic brake pressure in accordance with the larger of the above two inputs. In addition, an input rod of electronically controlled vacuum booster 2 is connected to brake pedal 1 via a lost motion mechanism so that even when electronically controlled vacuum booster 2 is operated according to a signal from electronic control unit U and the input rod shifts forwards, brake pedal 1 remains in the initial position.

A pair of output ports 8 and 9 of master cylinder 3 are connected to brake callipers $5_{FL}$, $5_{FR}$, $5_{RL}$ and $5_{RR}$ mounted on front wheels $W_{FL}$ and $W_{FR}$, and rear wheels $W_{RL}$ and $W_{RR}$ respectively via a hydraulic pressure control device 4, which is one of the components forming the braking device of the present invention. Hydraulic pressure control device 4 comprises four pressure regulators 6 corresponding to the four brake callipers $5_{FL}$, $5_{FR}$, $5_{RL}$ and $5_{RR}$. Each of the pressure regulators 6 is connected to electronic control unit U and thus individually controls the operation of brake callipers $5_{FL}$, $5_{FR}$, $5_{RL}$ and $5_{RR}$ mounted on front wheels $W_{FL}$ and $W_{FR}$ and rear wheels $W_{RL}$ and $W_{RR}$. Therefore, if the hydraulic brake pressure which is transmitted to each of brake callipers $5_{FL}$, $5_{FR}$, $5_{RL}$ and $5_{RR}$, is independently controlled by pressure regulators 6, anti-lock brake control to suppress locking of the wheels during braking, can be carried out.

Radar device $S_1$, which emits electromagnetic waves such as laser beam or millimeter-waves in the forward direction of the vehicle and senses the relative distance and the relative speed between an object such as a vehicle travelling in front and the vehicle based on the reflected wave; wheel speed sensors $S_2$, which sense the rotations of front wheels $W_{FL}$ and $W_{FR}$ and rear wheels $W_{RL}$ and $W_R$; yaw rate sensor $S_3$ which senses the yaw rate of vehicle V; and lateral acceleration sensor $S_4$ which senses the lateral acceleration of vehicle V; are connected to the electronic control unit U.

Electronic control unit U, based on a signal from radar device $S_1$ which forms an object sensing device of the present invention and signals from each of the sensors $S_2$ to $S_4$, controls the operation of the electronically controlled vacuum booster 2 and hydraulic pressure control device 4 as well as the operation of a warning device 7 comprising a loudspeaker 7.

Figure 3:
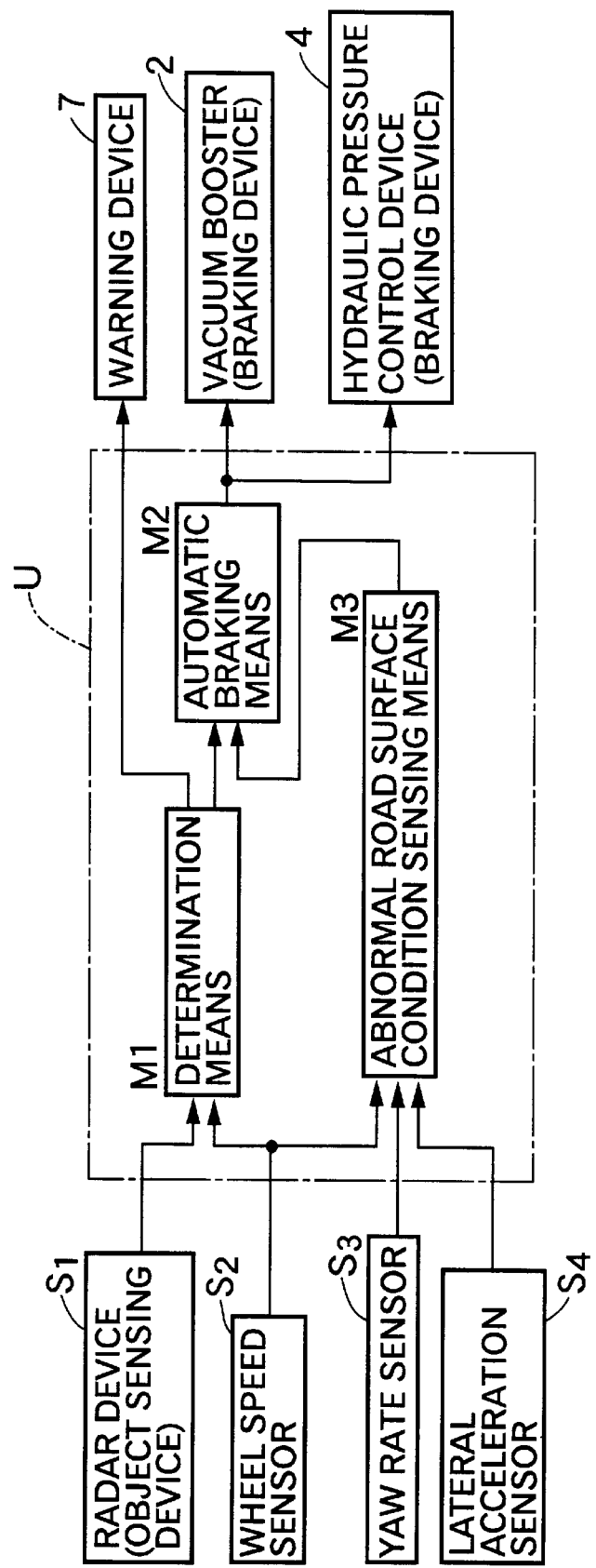
FIG. 3 is a block diagram showing the circuit layout of the electronic control unit according to the embodiment of the present invention.

As shown in FIG. 3, electronic control unit U comprises determination means M1, automatic braking means M2 and abnormal road surface condition sensing means M3. Determination means M1 determines whether or not it is necessary to generate an alarm or carry out automatic braking in order to prevent the vehicle from coming into contact with an object based on the relative distance and the relative speed between the vehicle and the object sensed by radar device $S_1$ and the vehicle speed and acceleration of the vehicle sensed by wheel speed sensors $S_2$. Specifically, when the relative distance between the vehicle and the object is smaller than a predetermined threshold value or when the relative speed at which the vehicle approaches the object is higher than a predetermined threshold value, it is determined that the possibility of contact of the vehicle with the object is high. At this point, taking into consideration the difficulty of preventing contact by carrying out a braking or steering operation when the speed or the positive acceleration of the vehicle is large, a further accurate determination can be carried out by correcting each of the threshold values based on the levels of speed and acceleration of the vehicle. Furthermore, it is also possible to consider the amount of overlap in the lateral direction between the vehicle and the object sensed by radar device $S_1$ and the turning state of the vehicle sensed by yaw rate sensor $S_3$.

When determination means M1 determines that there is a possibility of the vehicle coming into contact with the object, warning device 7 is operated by means of a buzzer sound or a voice, so as to induce the driver to actively brake, at the same time automatic braking means M2 operates electronically controlled vacuum booster 2 so as to generate a hydraulic brake pressure in master cylinder 3 and this hydraulic brake pressure operates brake callipers $5_{FL}$, $5_{FR}$, $5_{RL}$ and $5_{RR}$ so as to carry out automatic braking.

Abnormal road surface condition sensing means M3 senses abnormal road surface conditions (a so-called split Φ road) in which coefficients of friction of the road surface on which vehicle V is currently travelling are different for the right and left wheels, based on the signals from wheel speed sensors $S_2$ (or yaw rate sensor $S_3$ or lateral acceleration sensor $S_4$). Specifically, the vehicle speed is detected from an average value of the speeds of the right and left follower wheels, that is, the wheel speeds of rear right and left wheels $W_{RR}$ and $W_{RL}$ sensed by wheel speed sensors $S_2$ and $S_2$, and the slip rate of each wheel of the vehicle is calculated by comparing this vehicle speed with the wheel speed of each wheel sensed by wheel speed sensors $S_2$. When the difference in slip rate between front right and left wheels $W_{FR}$ and $W_{FL}$ is more than a specified value or when the difference in slip rate between rear right and left wheels $W_{RR}$ and $W_{RL}$ is more than a specified value, abnormal road surface condition sensing means M3 senses the abnormal road surface condition.

In addition, since the calculation of the slip rate of each wheel is carried out in an anti-lock brake system which is already installed in vehicle V, if the calculation results for the sensing of an abnormal road surface condition are used unchanged, the calculation load on electronic control unit U can be lessened and in particular, the cost can be reduced by the use of the existing anti-lock brake system.

Figure 4:
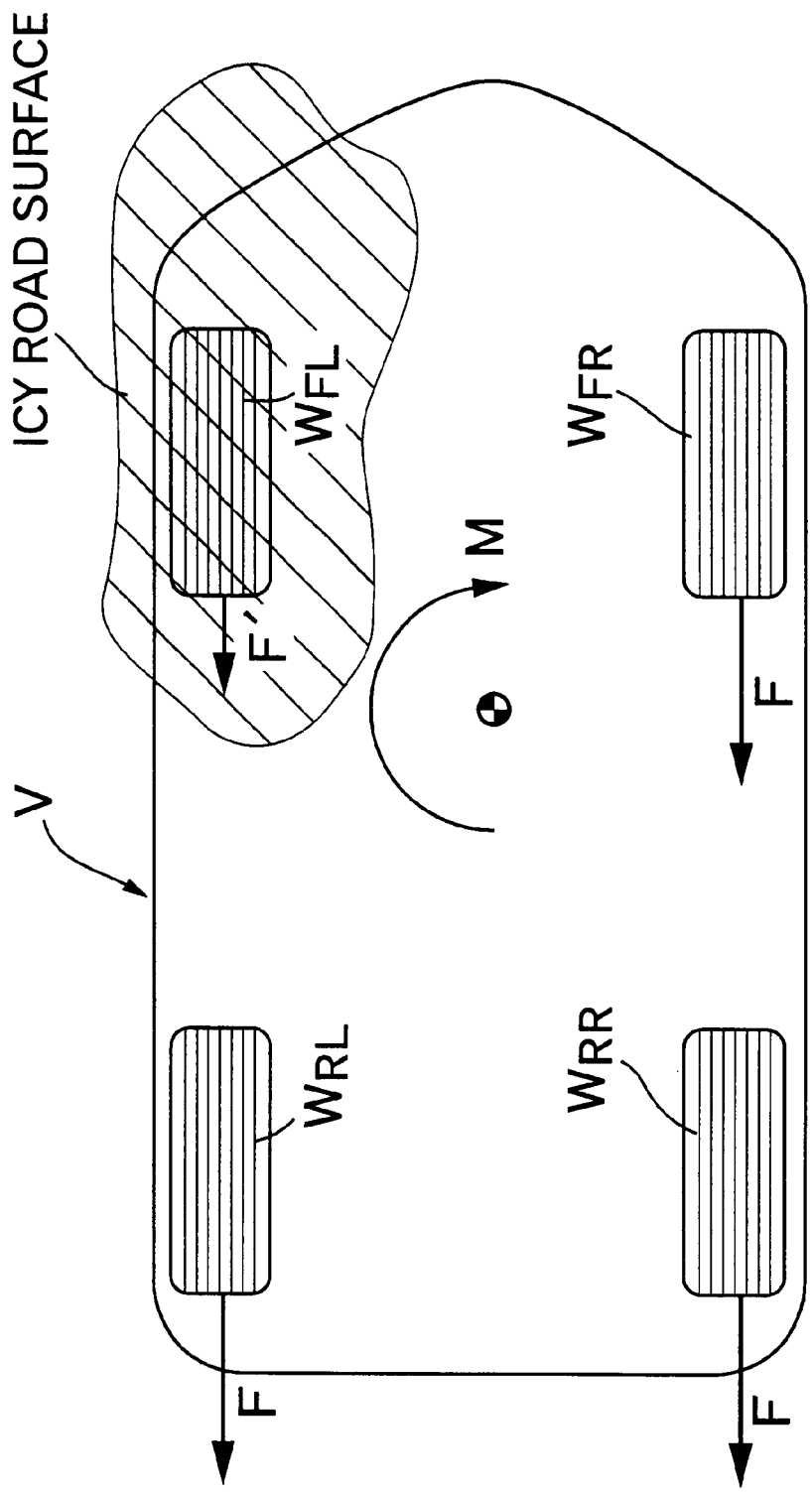
FIG. 4 is a sketch showing one example of an abnormal road surface condition.

FIG. 4 shows one example of abnormal road surface conditions in which only the front left wheel $W_{FL}$ is on a road surface having a low coefficient of friction such as an icy road surface. When carrying out braking in this state, since the braking force F' on front left wheel $W_{FL}$ is smaller than the braking forces F on the other three wheels $W_{FR}$, $W_{RL}$ and $W_{RR}$, a yaw moment M is caused in a clockwise direction around the center of gravity of vehicle V and thus there is a possibility that the behavior of vehicle V could become unstable.

Therefore, when abnormal road surface condition sensing means M3 senses an abnormal road surface condition, automatic braking means M2 controls electronically controlled vacuum booster 2 in a manner different from the normal manner and thus the rising gradient of the hydraulic brake pressure output from master cylinder 3 is suppressed so as to be lower than that of the normal state.

This operation is further explained by reference to the time chart in FIG. 5.

When determination means M1 determines at time $t_0$, that there is a possibility of the vehicle coming into contact with an object, automatic braking means M2 operates electronically controlled vacuum booster 2, the hydraulic brake pressure output from master cylinder 3 rises and brake callipers $5_{FL}$, $5_{FR}$, $5_{RL}$ and $5_{RR}$ operate due to this hydraulic brake pressure so as to start automatic braking (shown by the letter a). If, for example, only the front left wheel $W_{FL}$ is on a road surface having a low coefficient of friction as shown in FIG. 4 when automatic braking is started, front right wheel $W_{FR}$ on the road surface having a high coefficient of friction does not have a tendency to lock and its wheel speed gradually decreases (shown by the letter b), whereas front left wheel $W_{FL}$ on the road surface having a low coefficient of friction has a tendency to lock and its wheel speed rapidly decreases (shown by the letter c). Thus, a difference in the slip rate between the front right and left wheels $W_{FR}$ and $W_{FL}$ is caused due to the difference in the coefficient of friction of the road surface, and when the difference in slip rate becomes more than a specified value (for example, 5%) at time $t_1$, abnormal road surface condition sensing means M3 senses the abnormal road surface condition.

Thus, when an abnormal road surface condition is sensed at time $t_1$, the rising gradient of the hydraulic brake pressure output from master cylinder 3 can be suppressed to a low value by the instructions from automatic braking means M2 (shown by the letter d). At this point, the hydraulic brake pressure output from master cylinder 3 is transmitted unchanged to brake cylinder $5_{FR}$ of front right wheel $W_{FR}$ which does not have a tendency to lock, but in the case of brake cylinder $5_{FL}$ of front left wheel $W_{FL}$ which has a tendency to lock, the hydraulic brake pressure output from master cylinder 3 is transmitted after being controlled by pressure regulator 6 according to the anti-lock brake control. Specifically, the hydraulic brake pressure transmitted to brake cylinder $5_{FL}$ of front left wheel $W_{FL}$ is repeatedly decreased, held constant and then increased and, therefore, the slip rate of front left wheel $W_{FL}$ is controlled to an appropriate level to prevent it from locking (shown by the letters f and g).

When front left wheel $W_{FL}$ has passed the road surface having a low coefficient of friction at time $t_2$ and the wheel speeds of front right and left wheels $W_{FR}$ and $W_{FL}$ become identical, or when the yaw rate sensed by yaw rate sensor $S_3$ becomes small, the rising gradient of the hydraulic brake pressure output from master cylinder 3 returns to a normal state under the instructions from automatic braking means M2 (shown by the letter h); accompanying the wheel speeds of front right and left wheels $W_{FR}$ and $W_{FL}$ decrease (shown by the letter i) and thus automatic braking can be carried out effectively in order to prevent the vehicle from making contact with the object.

Thus, when an abnormal road surface condition is sensed at the time of starting automatic braking, the rising gradient of the hydraulic brake pressure output from electronically controlled vacuum booster 2 is suppressed to be lower than that of the normal state, and thus the behavior of the vehicle can be prevented from becoming unstable due to the action of a large yaw moment on the vehicle.

In the above-mentioned embodiment, the sensing of an abnormal road surface condition is carried out based on the slip rate of each of the wheels, but sensing of an abnormal road surface condition can also be carried out based on the yaw rate of vehicle V sensed by yaw rate sensor $S_3$. That is to say, in FIG. 5, for example, when automatic braking is started at time $t_0$ in a state where front left wheel $W_{FL}$ is on a road surface having a low coefficient of friction, front left wheel $W_{FL}$ slips, causing a yaw moment in the right-hand direction. When the yaw moment exceeds a threshold value at time $t_1$, abnormal road surface condition sensing means M3 can sense the abnormal road surface condition.

Thus, by suppressing the rising gradient of the hydraulic brake pressure output from master cylinder 3 at time $t_1$, to a lower level, the yaw rate in the present embodiment denoted by the solid line can be suppressed to a lower level in comparison with that in the conventional example denoted by the broken line, and it can be confirmed that the effect of stabilizing the vehicle behavior is exhibited.

Figure 6:
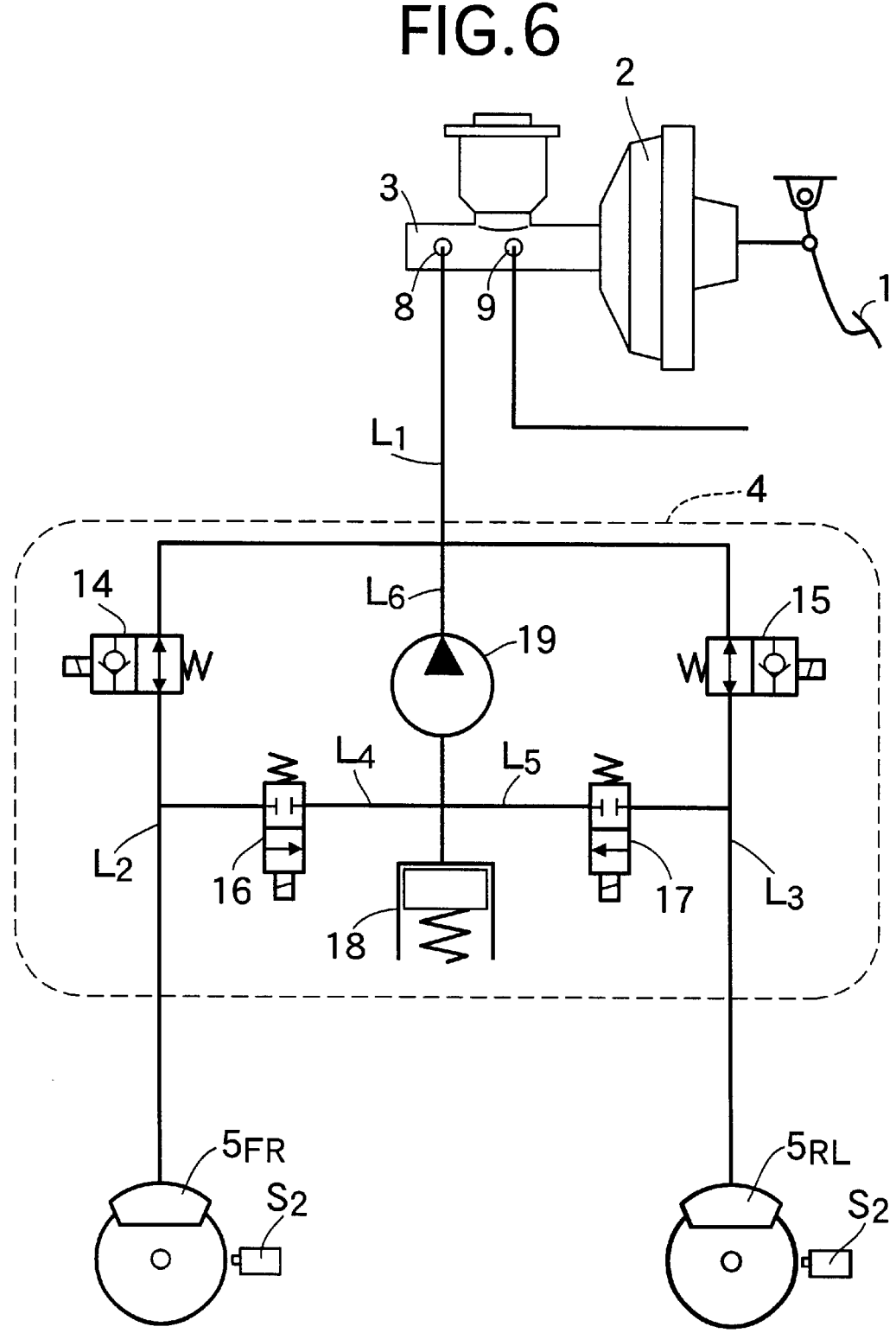
FIG. 6 is a block diagram of the brake system relating to a second embodiment of the present invention.

A second embodiment of the present invention is explained below by reference to FIG. 6.

In the first embodiment, electronically controlled vacuum booster 2 forms the braking device, but in the second embodiment electronically controlled vacuum booster 2 and hydraulic pressure control device 4 form the braking device. When automatic braking is started, electronically controlled vacuum booster 2 is operated by electronic control unit U, master cylinder 3 generates the maximum hydraulic brake pressure, and the hydraulic brake pressure is adjusted by hydraulic pressure control device 4 and transmitted to brake callipers $5_{FL}$, $5_{FR}$, $5_{RL}$ and $5_{RR}$.

Master cylinder 3 comprises two output ports 8 and 9; one of the output ports 8 is connected to brake callipers $5_{FR}$ and $5_{RL}$ of front right wheel $W_{FR}$ and rear left wheel $W_{RL}$ via hydraulic pressure control device 4 and the other port 9 is connected to brake callipers $5_{FL}$ and $5_{RR}$ of front left wheel $W_{FL}$ and rear right wheel $W_{RR}$ via hydraulic pressure control device 4. Although only hydraulic pressure control device 4 which connects one of the output ports 8 to brake callipers $5_{FR}$ and $5_{RL}$ of front right wheel $W_{FR}$ and rear left wheel $W_{RL}$ is shown in FIG. 6, hydraulic pressure control device 4 which connects the other output port 9 to brake callipers $5_{FL}$ and $5_{RR}$ of front left wheel $W_{FL}$ and rear right wheel $W_{RR}$ has an identical structure. Hydraulic pressure control device 4 for front right wheel $W_{FR}$ and rear left wheel $W_{RL}$ is explained below as a representative structure.

Oil paths $L_2$ and $L_3$ which are split off from oil path $L_1$ which extends from output port 8 of master cylinder 3, are connected to brake callipers $5_{FR}$ and $5_{RL}$ respectively via first changeover valves 14 and 15 which are comprised of solenoid valves. A pair of oil paths $L_4$ and $L_5$ which are split off from oil paths $L_2$ and $L_3$ on the downstream side of first changeover valves 14 and 15 are connected to reservoir 18 via second changeover valves 16 and 17 respectively which are comprised of solenoid valves, and hydraulic pressure pump 19 is connected to oil path $L_6$ which connects reservoir 18 and oil path $L_1$. First changeover valves 14 and 15 and second changeover valves 16 and 17 are connected to electronic control unit U and controlled thereby.

When braking is carried out manually, the first changeover valves 14 and 15 and second changeover valves 16 and 17 are all in the non-activated or de-energized state as shown in the figure, output port 8 of master cylinder 3 is connected directly to brake calliper $5_{FR}$ of front right wheel $W_{FR}$ and brake calliper $5_{RL}$ of rear left wheel $W_{RL}$ and the hydraulic brake pressure output from master cylinder 3 resulting from operation of brake pedal 1 is transmitted unchanged to brake callipers $5_{FR}$ and $5_{RL}$.

At the time when automatic braking takes place, if there is a state in which electronically controlled vacuum booster 2 is operated by instructions from electronic control unit U so that master cylinder 3 generates the maximum hydraulic brake pressure, the hydraulic brake pressure which is transmitted to brake callipers $5_{FR}$ and $5_{RL}$ can be controlled by the degree of opening of first changeover valves 14 and 15 using PWM. Therefore, in the same manner as in the first example, by so doing the rising gradient of the hydraulic brake pressure during automatic braking can be suppressed so that it is lower than that in normal braking, and large levels of yaw moment can be prevented from acting on vehicle V and thus the behavior of the vehicle can be stabilized.

At the time of anti-lock brake control, by activating or energizing second changeover valves 16 and 17 so as to open them under conditions in which first changeover valves 14 and 15 have been activated and closed, the hydraulic brake pressure transmitted to brake callipers $5_{FR}$ and $5_{RL}$ is diverted to reservoir 18 so as to decrease the pressure, and in this state by making second changeover valves 16 and 17 non-activated so as to close them, the hydraulic brake pressure transmitted to brake callipers $5_{FR}$ and $5_{RL}$ is maintained. In this state, by making first changeover valves 14 and 15 non-activated so as to open them, master cylinder 3 is connected to brake callipers $5_{FR}$ and $5_{RL}$ and thus the hydraulic brake pressure increases. The oil collected in reservoir 18 is returned to master cylinder 3 via hydraulic pressure pump 19.

As described above, by controlling first changeover valves 14 and 15 and second changeover valves 16 and 17 to open and close them and thus repeatedly decreasing, holding constant and increasing the hydraulic brake pressure transmitted to brake callipers $5_{FR}$ and $5_{RL}$, the braking forces on front right wheel $W_{FR}$ and rear left wheel $W_{RL}$ can be controlled independently so as to be at any level and the anti-lock brake function is thereby exhibited. In addition, front left wheel $W_{FL}$ and rear right wheel $W_{RR}$ can be controlled independently to have any level of braking force in the same manner as above.

A third embodiment of the present invention is next explained by reference to FIG. 7.

In the third embodiment, if determination means M1 determines at time $t_0$ that there is a possibility of the vehicle making contact with an object, automatic braking means M2 operates master cylinder 3 via electronically controlled vacuum booster 2 and carries out test braking for a short period (for example, 0.2 sec.). The deceleration of the test braking is set at a comparatively low value (for example, 0.3 G), and the driver is subjected to the bodily sensation of deceleration as a warning so as to cause the driver to actively decelerate, and at the same time sensing of an abnormal road surface condition is carried out based on the slip rate of each wheel, the operational status of the anti-lock brake system, the change in the yaw rate, the change in the lateral acceleration, etc. during the test braking.

If no abnormal road surface condition is sensed as a result, the actual automatic braking denoted by the broken line is started at time $t_1$, but if an abnormal road surface condition is sensed, the rising gradient of the braking force of the actual automatic braking is suppressed to a low level as denoted by the solid line, and thus the behavior of the vehicle can be prevented from becoming unstable. At time $t_2$ after starting the actual automatic braking the sensing of an abnormal road surface condition is carried out; if no abnormal road surface condition is sensed, that is, if vehicle V has already moved out of the abnormal road surface condition, the rising gradient of the braking force of the automatic braking is returned to a normal state at time $t_3$ (shown by the chain line). Therefore, the braking distance of the vehicle can be reduced to the greatest extent and thus the avoidance of contact of the vehicle can be enhanced. In addition, when an abnormal road surface condition is sensed as a result of test braking and actual automatic braking is carried out with a low rising gradient, in order to compensate for the decrease in braking force due to the low rising gradient, it is preferable to set the time of starting the actual automatic braking so that it is earlier than the case of normal conditions.

The test braking is carried out by braking only the front wheels $W_{FL}$ and $W_{FR}$. The reason therefor is that deceleration due to the test braking which is sensed by the driver's body cannot be made too large in terms of saleability, and if both the front wheels $W_{FL}$ and $W_{FR}$ and the rear wheels $W_{RL}$ and $W_{RR}$ are subjected to test braking, the braking force on each of the wheels becomes small and there is a possibility that sensing of an abnormal road surface condition could not be carried out with accuracy. On the other hand, if only the front wheels $W_{FL}$ and $W_{FR}$ are braked, the deceleration sensed by the driver's body can be prevented from becoming extremely large and causing a disagreeable sensation, while ensuring that the braking forces on the front wheels $W_{FL}$ and $W_{FR}$ are sufficient, and sensing of an abnormal road surface condition is carried out accurately.

Figure 5:
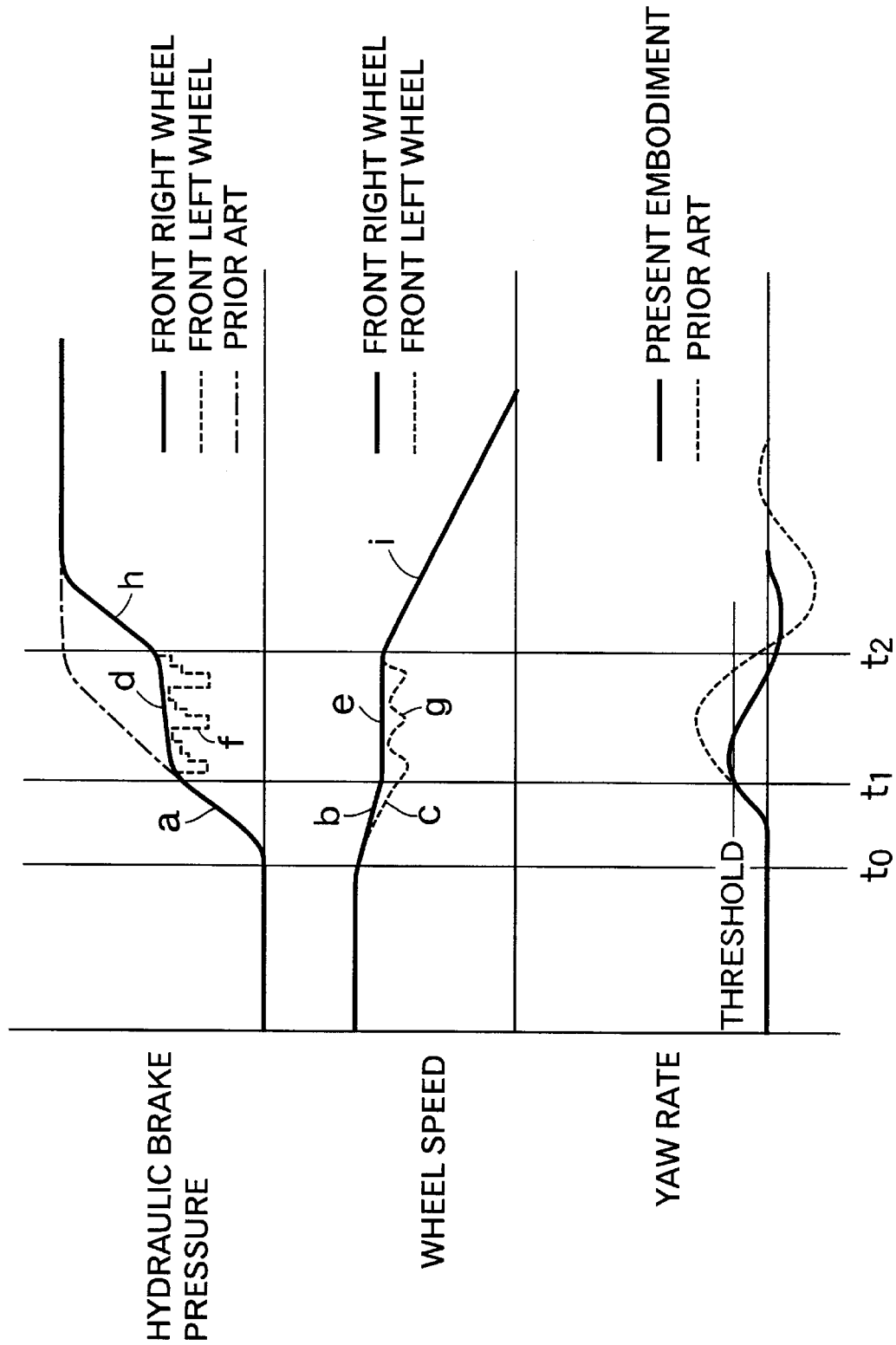
FIG. 5 is a time chart for explanation of the action of the first embodiment of the present invention.

Variations in the structure of the present invention can be used, for example, an abnormal road surface condition can be sensed based on the lateral acceleration of vehicle V sensed by lateral acceleration sensor $S_4$ instead of the sensing of an abnormal road surface condition based on the yaw rate (shown by FIG. 5). Furthermore, the hydraulic brake pressure during automatic braking can be generated by another means such as a hydraulic pressure pump, instead of master cylinder 3.

In accordance with the embodiment of the invention, when the object sensing device senses an object which is present in the direction in which the vehicle is advancing, based on the sensing results, the determination means determines the possibility of making contact with the object based upon the relative position between the vehicle and the object, and when it is determined that there is a possibility of making contact with the object, the automatic braking means operates the braking device to carry out automatic braking in order to avoid of making contact with the object. When the abnormal road surface condition sensing means senses an abnormal road surface condition in which the coefficients of friction of the road surface are different for the right and left wheels, the automatic braking means sets a lower rising gradient for the braking force of automatic braking, thereby preventing the behavior of the vehicle from becoming unstable due to the occurrence of an undesirable yaw movement and thus contact can be avoided.

Further, in accordance with another embodiment of the present invention, in an abnormal road surface condition in which the coefficients of friction of the road surface for the right and left wheels are different, since the slip rate of the wheel on the road surface having a small coefficient of friction becomes higher than that of the wheel on the road surface having a large coefficient of friction, the abnormal road surface condition can be sensed with certainty, based on the difference in the slip rate between the right and left wheels.

Still further, in an abnormal road surface condition in which the coefficients of friction of the road surface for the right and left wheels are different, since the wheel on the road surface having a small coefficient of friction slips to an excess extent due to the automatic braking thus causing operation of the anti-lock brake system, the abnormal road surface condition can be sensed with certainty based on the operational status of the anti-lock brake system. In particular, since an existing anti-lock brake system is used, not only can the calculation load on the abnormal road surface condition sensing means be lessened, but it can also contribute to a reduction in cost.

Further, in accordance with another embodiment of the present invention in an abnormal road surface condition in which the coefficients of friction of the road surface for the right and left wheels are different, since the wheel on the road surface having a small coefficient of friction slips due to the automatic braking, sooner than the wheel on the road surface having a large coefficient of friction thus increasing the yaw rate or causing a lateral acceleration, the abnormal road surface condition can be sensed based on the yaw rate or lateral acceleration.

Still further, since an abnormal road surface condition is sensed by carrying out test braking at the time of starting automatic braking, the control of the rising gradient of the braking force to lower the gradient can be performed without delay during an actual automatic braking following the test braking, and thus the behavior of the vehicle can be prevented from becoming unstable with certainty. Furthermore, the subjecting of the driver's body to a sensation of deceleration functions as a warning accompanying the test braking active braking.

By applying sufficient braking force to the front wheels an abnormal road surface condition can be sensed with certainty, while at the same time the deceleration due to the test braking which is sensed by the driver's body, can be suppressed to a low level and thus any disagreeable sensations can be eliminated.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A brake control system for a vehicle comprising:
   an object sensing device for sensing an object positioned in the direction in which the vehicle is advancing,
   braking devices for braking the vehicle,
   a determination means, coupled to said object sensing device for determining the possibility of contact between the vehicle and the object based upon the relative positions of the vehicle and the object based on the output of said object sensing device,
   an automatic braking means coupled to said determination means for carrying out an automatic braking by operation of said braking devices based on the output of said determination means, and
   an abnormal road surface condition sensing means coupled to said automatic braking means, for sensing an abnormal road surface condition wherein the coefficients of friction of the road surface are different for right and left wheels of the vehicle, and wherein when said abnormal road surface condition sensing means senses an abnormal road surface condition, said automatic braking means sets a rising gradient of the braking force for the automatic braking, lower than the rising gradient when an abnormal road surface condition is not sensed.

2. A brake control system for a vehicle according to claim 1, wherein said abnormal road surface condition sensing means senses an abnormal road surface condition based on a difference in a slip rate between the right and left wheels at the time of starting automatic braking.

3. A brake control system for a vehicle according to claim 1, wherein said abnormal road surface condition sensing means senses an abnormal road surface condition based on the operational status of the anti-lock brake system of the vehicle, at the time of starting automatic braking.

4. A brake control system for a vehicle according to claim 1, wherein said abnormal road surface condition sensing means senses an abnormal road surface condition based on a yaw rate of the vehicle, at the time of starting automatic braking.

5. A brake control system for a vehicle according to claim 1, wherein said abnormal road surface condition sensing means senses an abnormal road surface condition based on a lateral acceleration of the vehicle, at the time of starting automatic braking.

6. A brake control system for a vehicle according to any one of claims 2 to 5, including means for test braking the vehicle in order to sense an abnormal road surface condition, the test braking being carried out at the time of starting automatic braking, wherein during the test braking said abnormal road surface condition sensing means carries out the sensing of an abnormal road surface condition.

7. A brake control system for a vehicle according to claim 6, wherein only the front wheels are braked during the test braking.

* * * * *